Figure 1:
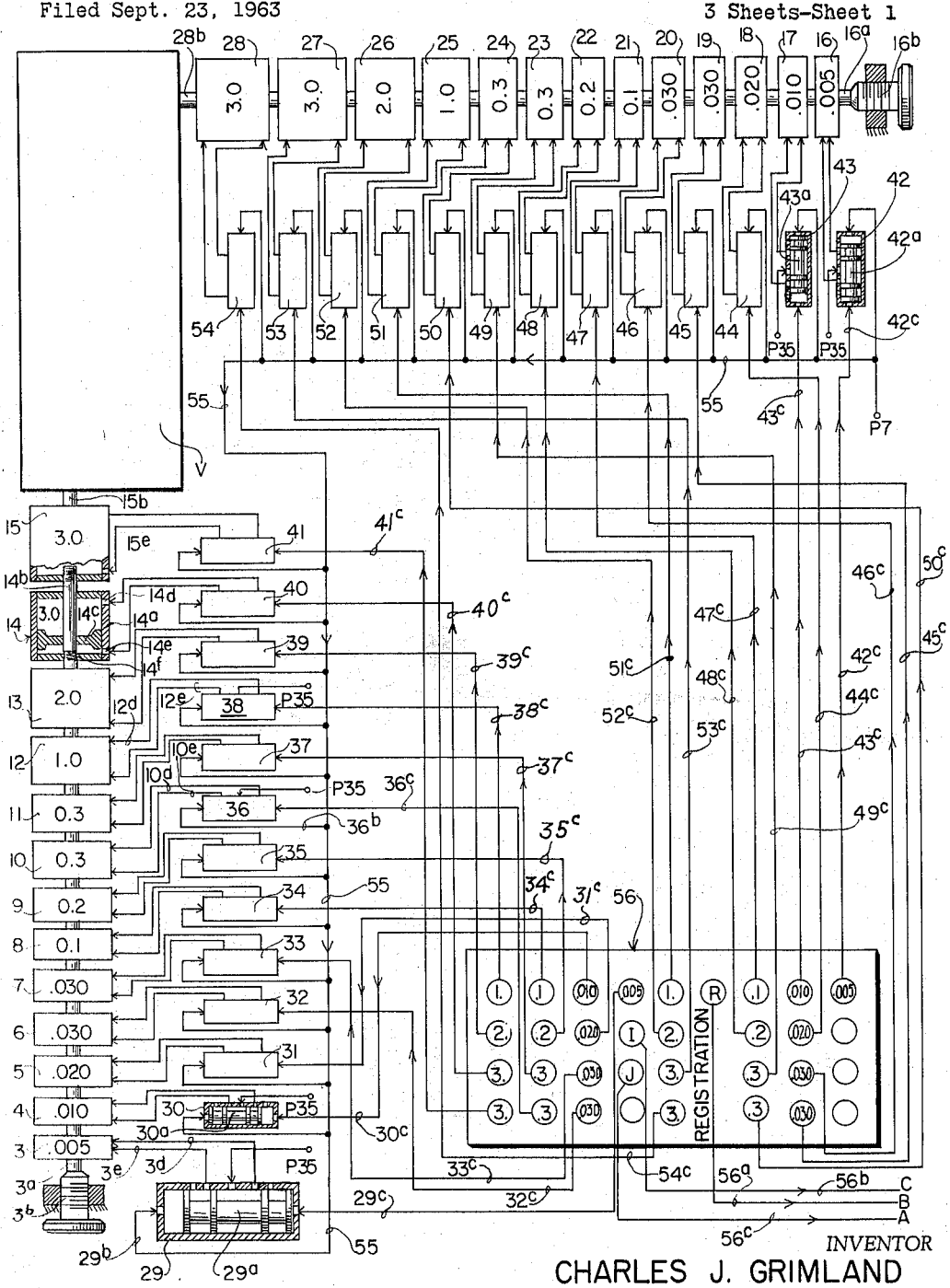

March 29, 1966   C. J. GRIMLAND ETAL   3,242,772
COORDINATE PLOTTING AND CONTROL SYSTEM
Filed Sept. 23, 1963   3 Sheets-Sheet 1

INVENTOR
CHARLES J. GRIMLAND
ROBERT F. McMURRAY
BY *Alexander & Dowell*
ATTORNEY March 29, 1966 C. J. GRIMLAND ETAL 3,242,772
COORDINATE PLOTTING AND CONTROL SYSTEM
Filed Sept. 23, 1963 3 Sheets-Sheet 3

INVENTOR
CHARLES J. GRIMLAND
ROBERT F. McMURRAY
BY Alexander F. Powell
ATTORNEY

United States Patent Office 3,242,772
Patented Mar. 29, 1966

3,242,772
COORDINATE PLOTTING AND CONTROL SYSTEM
Charles J. Grimland, Garland, and Robert F. McMurray, Grapevine, Tex., assignors to The Geotechnical Corporation, a corporation of Delaware
Filed Sept. 23, 1963, Ser. No. 310,525
20 Claims. (Cl. 77—32.2)

This invention relates to automated machinery, and more particularly to a system for reading information stored in a record such as a tape, and for translating this information into machine motions and/or functions.

It is a major object of this invention to provide a highly accurate and dependable system of control for converting information recorded on a tape into coordinate positions of a work performing machine head with respect to a table to which a work piece is clamped or otherwise secured, and then to operate the machine head to accomplish its function. In the illustrative example, with respect to which the invention is described in detail hereinafter, the machine is a drilling machine for automatically drilling a pattern of holes in a sheet material work piece with a high degree of reproducibility, the position of each hole being defined in terms of X and Y coordinates on the tape.

It is another important object of this invention to provide a control system having coordinate positioning means each comprising a plurality of double-acting incremental actuators connected in series so that their combined increments of motion are cumulative, and the motion in the direction of the coordinate which the series represents being determined by which of the actuators is in its extended or retracted position, and the individual actuators in each series being connected with a control system including a tape reader by which the instantaneous positions of the actuators are controlled.

Still another object of this invention is to provide a high-speed automation system including sequentially operating gate means for controlling in proper succession the performance of a sequence of machine positioning and work performing functions, the machine control sequence allowing as much time to each function as is necessary to complete it, but then immediately moving ahead to the next function as soon as completion of the prior function is accomplished so that there are no unnecessary or unproductive time gaps, but on the other hand the time allotted to each function is determined not by a timer, but only by the proper completion of the function.

A further object of the invention is to provide accelerometer means or other switch means on each moving member of the machine which is positioned by the control system for determining the completion of a function and for initiating the start of a new function.

It is a further object of the invention to provide a fail-safe system wherein a failure or malfunction tends to stop the machine at that point in the sequence until the trouble can be located and disposed of.

Another object of the invention is to provide a novel control system which can be implemented either by electrical or by pneumatic components, the illustrative example shown in the drawings being drawn in terms of the latter.

Figure 2:
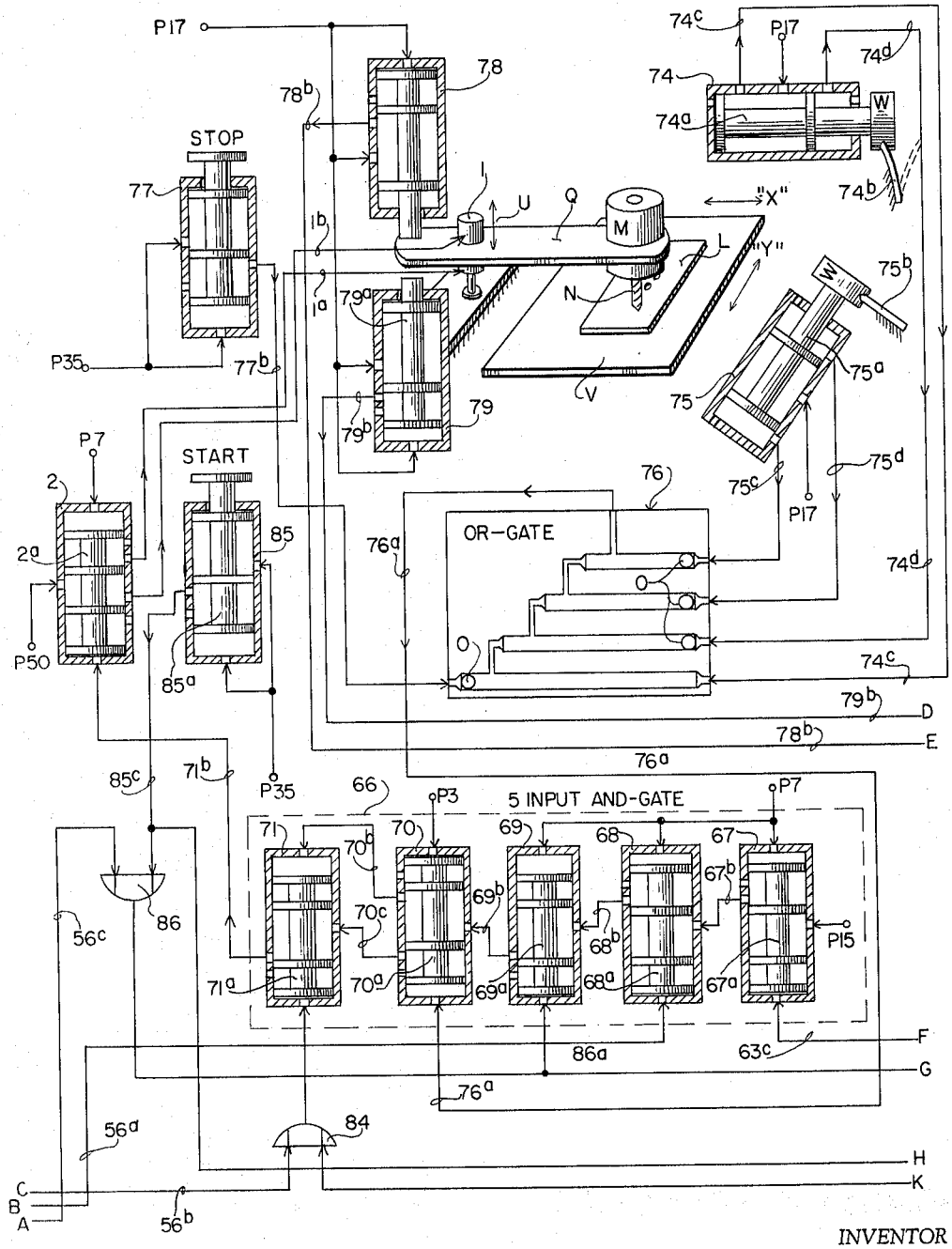
Figures 3, 4:
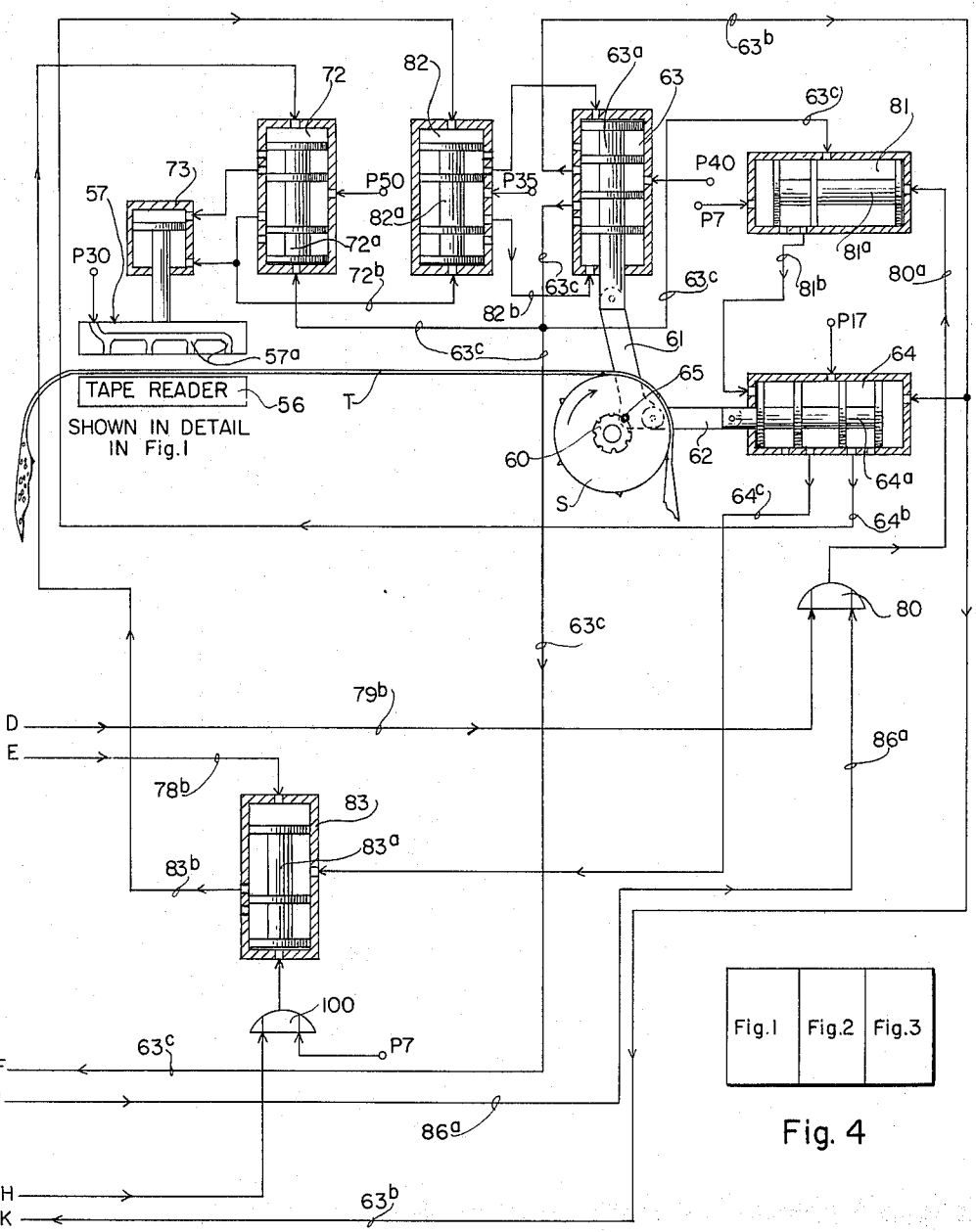

Other objects and advantages of the invention will become apparent during the following discussion of the drawings, wherein:

FIGS. 1, 2, and 3, when combined as shown in FIG. 4 form a composite schematic diagram of a practical working embodiment of the invention.

Referring now to the drawings, the practical embodiment illustrated comprises circuitry in which various valves, actuators, accelerometers, check valves, and other components are joined together by lines which in the illustrations, represent tubing through which pneumatic pulsations are transmitted between the components. In an analogous electrical circuit, the tubing would be replaced by wires, the check valves by diodes, the various other valves by switches, and the actuators by solenoid operated relays and plungers. The various pneumatic gates also correspond with analogous electrical "and" gates and "or" gates, many types of which are well-known in the prior art.

The pneumatic embodiment operates from commercially available compressed-air sources and regulators which maintain constant pressures. These regulated sources are schematically represented on the drawings as pounds per square inch of pressure P3, P7, P15, P17, P25, P30, P35, P40, and P50 connected to various components as shown in FIGS. 1–3.

FIGS. 1–3 when joined together as shown in FIG. 4, comprise a single diagram of the system in which the pneumatic circuit tubes are joined between figures at various junctions labeled A, B, C, D, E, F, G, H, and K. In FIG. 2, there is illustrated a typical machine tool structure which is actuated by the present control system. The purpose of the machine in the present illustrative embodiment is to move a work piece comprising a fibre board L back and forth to position it with respect to a drill bit N driven by a motor M. This is accomplished by relatively positioning a motor support bracket Q and a work supporting table V with respect to each other. In the present illustrative embodiment, the motor support bracket Q remains fixed in location but can be moved up and down in the direction of the arrow U, and the worktable V can be moved in two different directions X and Y. However, another practical embodiment of the system has been built in which the worktable V is moved back and forth in the X direction and the motor support Q moved in the Y direction, and the latter also reciprocates in the direction U in order to perform a drilling function.

A double-acting air cylinder 1 is connected between a stationary portion of the machine frame and the motor support Q, and raises and lowers the motor M and drill N whenever the tubing 1a or 1b is pressurized by the control valve 2. This control valve has a sliding spool valving means 2a which is ordinarily pushed into the down position in which it is illustrated by bias pressure applied at its upper inlet duct from a source of pressure P7, representing 7 p.s.i. In this position, the pressure from the source P50 (50 p.s.i.) passes from the spool and into the tubing 1b and maintains the drill motor M and bracket Q in its raised position. The position of the mechanism when the motor M is lowered by pressurizing the tube 1a and the other end of air cylinder 1 will be discussed hereinafter.

The worktable V is moved in the X direction or in the Y direction by two separate series of incremental actuators which are shown in FIG. 1 and the actuators of which are mechanically connected in series. At their moving ends, they are each connected with the worktable V so as to provide movements thereof in the X–Y plane.

There are 13 actuators in the X series and 13 actuators in the Y series, and these actuators are respectively labeled 3, 4, 5, 6, 7, 8, 9, 10, 11, 12, 13, 14, 15; and 16, 17, 18, 19, 20, 21, 22, 23, 24, 25, 26, 27, 28. For the sake of simplicity only the actuator 14 has been shown in cross-section, and this actuator comprises a double-acting cylinder 14a closed at each end and having a shaft 14b extending out through one end and threaded therebeyond. The shaft 14b includes a piston 14c reciprocated by pressure introduced at one of the inlet ducts 14e or 14d to move the piston to fully expanded position, or to fully retracted position as shown in FIG. 1. The lower end of the actuator 14 has a threaded opening 14f to receive the next lower actuator shaft, which is likewise threaded at its outer end. Each of the actuators 3–28 inclusive has a perfectly definite increment of movement which it can contribute. These contributed increments along both the X coordinate and the Y coordinate respectively comprise in inches .005, .010, .020, .030, .030, 0.1, 0.2, 0.3, 0.3, 1.0, 2.0, 3.0, and 3.0. Each of these actuators either provides no increased increment when it is in retracted position as shown in the drawings with respect to actuator 14, or else when in expanded position it contributes the increment labeled on that actuator as just enumerated. The entire change in increment is a little bit less than 10 inches for each of the illustrated components but it is to be understood that either more or fewer actuators could be used to provide a wider range of incremental contributions.

The outer end of the final actuator 15, comprising the shaft 15b is coupled to the worktable V so as to control its X position. The inner end of the series-connected X actuators is connected as at 3a with an adjustment screw 3b by which a zero positioning of the entire string of actuators can be accomplished. Likewise, the string of Y actuators includes a connection at 16a with a lead screw 16b serving to provide zero adjustment of the entire Y string of actuators, and the outer end of the string at 28b is connected to the worktable V in such a manner as to control the Y position of the table.

A plurality of amplifier valves 29, 30, 31, 32, 33, 34, 35, 36, 37, 38, 39, 40, 41; and 42, 43, 44, 45, 46, 47, 48, 49, 50, 51, 52, 53, 54 are respectively connected to each of the actuators 3–28 inclusive, and control the two possible inputs to each of the actuators. One of the inputs to each actuator is at all times pressurized so that the actuator is either definitely in expanded position or definitely in retracted position depending on the position of its associated amplifier valve. Each of the valves is at all times provided with a 35 p.s.i. input at the longitudinal center of its body, and each one of these central inputs is connected with a source of pressure P35 labeled in the drawings with respect to valves 29, 30, 42, and 43 which are shown in detail. Each of the valves includes a sliding spool in it, and these spools are shown in two different positions in FIG. 1, the spools in valves 29 and 42 being shown in such a position as to retract the actuators 3 and 16 respectively, and the valves 30 and 43 being shown in such positions as to expand the associated actuators 4 and 17. Tubing 55 provides bias to one end of every one of the amplifier valves 29 through 54 inclusive so that normally the spools within these valves are pushed in the directions shown for the spool 29a in valve 29, and for the spool 42a in valve 42, but each of the valves 29–54 has an input port at its opposite end, and all 26 of these input ports at the other ends of the amplifier valves can be selectively pressurized by a punched tape reader which will be presently described. When the tubes going to the other ends of the amplifying valves are pressurized at a pressure exceeding that of the bias pressure source P7 in tubing 55, the spools will be pushed in the opposite direction. For instance, the spools 30a and 43a are moved against the pressure from the source P7 so as to reverse the direction in which the associated double-acting actuator is moved. For example, when the spool 29a is in the rightmost position, meaning that the bias pressure from the line 55 exceeds the pressure within the tube 29c at the right end of the cylinder 29, the spool 29a in its right position vents the duct 3e to the atmosphere and connects the pressure source P35 to the duct 3d to retract the actuator 3. On the other hand, when pressure is applied to the right end of the cylinder 29 in excess of 7 p.s.i., the spool 29a is moved to the left, thereby connecting the duct 3e to the pressure source P35 and venting the duct 3d to thereby expand the actuator 3 and cause it to contribute .005 inch. Thus, a relatively higher pressure applied at the right end of the cylinder 29 to overcome the bias from the tube 55 shifts the normally retracted actuator 3 to expanded position until the pressure is again reversed. This same description of operation also applies to the other amplifying valves shown in FIG. 1.

Referring now to FIG. 3, a punched tape T passes over and is advanced periodically by a sprocket S. The sprocket draws the tape over a tape reader plate 56, which plate is shown in more detail in FIG. 1 so as to illustrate the various reader ports or holes appearing in the plate in a manner well known per se. The tape is periodically clamped against the reader plate 56 by a reader clamp 57 periodically operated by an air cylinder 73 in a manner to be described hereinafter. The reader plate 56 has 33 holes therein arranged in predetermined pattern and communicating with a like pattern of holes in clamp 57, which holes are connected by ducts 57a which in turn are connected with a 30 p.s.i. source of pressure P30. The tape has holes punched therein in nine columns extending parallel with its length, and each reading of the tape by the plate includes bits taken simultaneously from four rows of holes. As is well known in the prior art, the clamp 57 attempts to supply pressure to all of the ports in the plate 56, but whether or not the pressure reaches the ports in the plate 56 depends on whether or not a hole corresponding with that location has been punched in the tape T. Most of the ports in the tape reader plate 56, FIG. 7, are connected by an output tube with an amplifier valve, these tubes being respectively labeled 29c, 30c, 31c, 32c, 33c, 34c, 35c, 36c, 37c, 38c, 39c, 40c, 41c; and 42c, 43c, 44c, 45c, 46c, 47c, 48c, 49c, 50c, 51c, 52c, 53c and 54c.

In eight of the nine columns of holes, most of the information serves to instruct particular actuators to provide increments of motion, although the holes labeled I and J serve to control other functions. The hole marked R on the tape reader plate 56 merely verifies registration of the tape T with the plate at the instant when the positions of the other holes in the four rows are read. For instance, if there is a hole in the tape corresponding with the upper left-hand port in the reader plate 56, the tube 38c will be pressurized and will pressurize the duct at the right end of the amplifier valve 38, thereby shifting its spool to the left and causing pressure from the source P35 to be applied to the tube 12e to expand the actuator 12 and contribute an increment of one inch to the length of the series of X actuators. Although most of the outputs from the tape reader plate 56 are connected to the valves 29 through 54 inclusive, there is an output 56a connected with the registration port R in the plate 56, and there are other possible outputs 56b and 56c respectively connected with the two other ports marked I and J, and these outputs are connected with external gates which perform a control function which is presently to be described.

As mentioned above, the punched tape T is drawn over a tape reader plate 56, and at appropriate moments the tape reader clamp 57 clamps the tape tightly against the plate 56 and supplies air to duct positions which are located respectively opposite the ports in the tape reader plate 56. The tape T operates as a valve at each of the ports and passes air thereto only if there is a hole in the tape at that location. The tape passes over and is periodically advanced by a sprocket wheel S which is in turn advanced by a ratchet wheel 60 having a plurality of notches around its periphery. The advancement of the ratchet wheel 60 is accomplished by two linkages 61 and 62 which are respectively reciprocated by combined valve and actuator means 63 and 64. The linkage 61 carries a pin 65 which engages a notch in the ratchet wheel 60 whenever the plunger 64c in the actuator means 64 is advanced toward the wheel. When engagement is made as shown in the drawing, advancement of the plunger 63a of the actuator means 63 causes rotation of the ratchet wheel 60 and the sprocket in a clockwise direction to advance the tape T by four rows of holes, each group of four rows comprising the information required to drill one hole in the workpiece L.

Assuming that the plunger 63a has just been advanced in the downward direction and has just caused the ratchet wheel 60 and sprocket S to rotate to a new position, the plunger 63a which also comprises a spool valve will cause pressure from the source P40 to be supplied to the tube 63c and will vent the tube 63b. Thus, the tube 63c will deliver pressure through the connections F and into the first input of a five-input "and" gate generally referred to by the reference numeral 66. The "and" gate 66 comprises five valves 67, 68, 69, 70 and 71. The valves 67, 68, and 69 have their upper ends connected with pressure source P7 which in the absence of an input to the lower end of the valve maintains the spools therewithin in the "down" position shown in the drawing. However, when an input is applied to the valve 67 through the tube 63c, the spool 67a is driven upwardly, thereby applying pressure from the source P15 to the output 67b. At this point, the five-input "and" gate 66 is enabled in its valves 67 and 69 (normally enabled). The tube 63c also connects to another valve 72 at its lower end and moves the spool 72a in this valve to its upper position, wherein pressure from the source P50 which has been previously applied to the lower port in the double-acting cylinder 73 is reversed to the upper port, thereby closing the clamp 57 against the tape and delivering pressure from the source P30 through the tape and into the tape reader 56.

In other words, when the ratchet 60 and sprocket S have been advanced to a new position, an output in the tube 63c clamps the tape in the new position by actuating the cylinder 73 and the clamp 57, and partially enables the gate 66. When the "and" gate 66 is fully enabled as will be hereinafter described, the valve 2 will be actuated to energize the double-acting cylinder 1 and advance the drill bit into the work piece L.

When the clamp 57 closes against the tape and pressurizes certain ports therethrough, if the tape is properly registered with the reader plate 56, an output will be delivered through the registration hole R, into the tubing 56a (FIG. 1), through the connections B, and into the lower end of the valve 68, thereby driving the spool 68a upwardly against the bias from the pressure source P7 and enabling a third input to the "and" gate 66 by conducting the pressure in the tube 67b into the tube 68b. Since the valve 69 is normally in its illustrated position, at this point pressure will also appear in the tube 69b.

Simultaneously, the other holes in the tape are pressurized and the X and Y increments are read and delivered through some of the tubes 29c through 54c inclusive to actuate corresponding ones of the amplifier valves 29–54 which in turn actuate their associated double-acting actuators 3–28 inclusive to set up the new X and Y incremental locations. Whenever X and/or Y actuators are actually in motion the worktable V also moves, carrying with it X and Y accelerometers 74 and 75 which comprise valve bodies attached to the worktable V and including inertia sensitive spools 74a and 75a which include weights W for sensing accelerations. These accelerometers also include springs 74b and 75b which, during periods of rest of the worktable V, maintain the spools in centralized positions as shown in the drawing in valve 75. On the other hand, if the worktable V is accelerating or decelerating, for instance moving in the leftward X direction while decelerating, the inertia of the weight W will cause the spool 74a to move to the left and connect the pressure source P17 with the output 74c. However, in the absence of any acceleration (see accelerometer 75), there is no output into any of the tubes 75c or 75d, but during acceleration or deceleration in the Y direction the spool shifts off-center and one of these tubes is pressurized from the source P17.

These tubes 74c, 74d, 75c and 75d are connected to the right hand inputs of a five-input "or" gate 76. If the motion detector means represented by the accelerometers 74 and 75 are pressurizing any of these four inputs, an output will appear in the tube 76a and this output will pressurize the lowermost port of the valve 70 and move the spool 70a to its upper position against the bias of 3 p.s.i. supplied by a pressure source P3. In the drawing, the left output 74c from the accelerometer 74 is pressurized and therefore there is an input to the "or" gate 76 from the tube 74c, accompanied by an output in the tube 76a, which output signifies that the worktable V is not yet fully oriented with respect to the work head including the motor M and drill bit N.

The five-input "or" gate comprises four passages containing small balls bearing the reference character O serving as check valves to prevent pressure, for instance from the tube 74c, from re-entering the other tubes 77b, 74d, 75c, and 75d. The ball in the lowermost duct of the "or" gate 76 has moved against the leftmost seat so as to prevent pressure from the line 74c from entering the stop drilling control valve 77, which will be hereinafter described. Thus, the pressure from the tube 74c can only go through the passage ways in the "or" gate 76 and out through the tube 76a to raise the spool 70a in the five-input "and" gate 66 to its uppermost position as shown in the drawing. Since an output from any of the four output ports of the accelerometers 74 and 75 signifies that the worktable V is still in motion, as long as the spool 70a is raised into its uppermost position as shown in the drawing, drilling is postponed.

Still referring to the valve 70 in the "and" gate 66 which serves the purpose of delaying drilling until no further output from the accelerometers 74 and 75 is received, when the spool 70a in in the upper position, output pressure is delivered to the tube 70b from the tube 69b which drives the spool 71a downwardly to the position shown in the drawing. At this time, there is no output into the tube 71b because the tube 70c is blocked by the spool 70a. Therefore, the spool 2a in the valve 2 remains in its down position, thereby retaining pressure from the source P50 on the tube 1b and maintaining the motor M in the extreme retracted position of its reciprocatory stroke, which maintains the valve 78 in its raised position as shown in FIGURE 2. The valve 78 is a detector means which senses that the motor M and the bracket Q are in retracted position and deliver an output to the tube 78b which passes through connections E and into FIGURE 3, for the purpose hereinafter to be described.

As soon as the wortable V has reached its intended position and no further output is had from either accelerometer 74 or 75, the delay gate 70 is no longer pressurized by the tube 76a, and the spool 70a is pushed to its "down" position by the pressure source P3. In this position, an output is delivered from the tube 69b into the tube 70c and to the tube 71b which represents the main output from the "and" gate 66, this ouput commanding the system to commence drilling.

This output raises the spool 2a against the bias from source P7 and delivers the pressure from the source P50 into the tube 1a which drives the cylinder 1 to advance the motor M to place the drilling bit N into drilling contact with the work piece L, thereby releasing the valve 78 to drop into its lowermost position and depressurizing tube 78b. The drilling progresses until the bit N breaks through the work piece L and further dropping of the bracket Q to the extreme advanced position of its reciprocatory stroke presses the spool 79a in a position detector valve 79 downwardly and delivers pressure from the source P17 into the tube 79b. This pressure is delivered through the connections D and through an "or" gate 80 and the tube 80a into the valve 81, thereby driving the spool 81a leftwardly against the bias from pressure source P7. At this moment the spool 63a is still in down position and therefore pressure is still being delivered through the tube 63c and into the central port of the valve 81 and through the output port 81b into the combined valve and actuator means 64. The pressure from the tube 81b drives the spool 64a to the right, thereby retracting the pin 65 away from the ratchet wheel 60, and at the same time delivering an output pressure through the tube 64b and into the valve 82. This pressure drives the spool 82a downwardly and connects the pressure source P35 to the tube 82b to drive the spool 63a upwardly and raise the pin 65 into elevated position in preparation for the next advance of the ratchet wheel 60. At the same time, the spool 63a connects the pressure source P40 with the tube 63b and removes the pressure from the tube 63c. The newly applied pressure to the tube 63b advances the spool 64a and reengages the pin 65 with the ratchet wheel 60 and also applies pressure to the bottom end of spool 71a which shifts spool 71a to an upward position. This cuts off gate 5 and allows the piston 1 to return to its up position. The drill cannot move downwardly until delay valve 70 outputs through line 70b to turn gate valve 71 on by driving the spool 71a down, while at the same time removing pressure from the tube 64b and delivering it to the tube 64c. This pressure is delivered to the valve 83 whose spool 83a is still in the "down" position as shown in FIGURE 3, and therefore the pressure passes through the valve 83 and out through the tube 83b and into the upper end of valve 72 to drive the spool 72a downwardly and connect the source P50 with the lower end of the cylinder 73, thereby raising the clamp 57 from the tape T. An output is also delivered into the tube 72b which drives the spool 82a upwardly thereby reconnecting the pressure source P35 to the upper input port of the combined valve and actuator means 63, while at the same time removing pressure from 82b at the lower end of the actuator means. Thus, the actuator plunger 63a is driven downwardly, thereby indexing the sprocket wheel S to a new position in which a new group of four rows of holes through the tape will be aligned with the ducts 57a and with the ports in the tape reader plate 56, FIG. 1. This is where the explanation of the cycle began above, and therefore a complete cycle has been concluded except for several auxiliary functions yet to be described.

Referring again to the tape reader plate 56 in FIG. 1, the hole I, tube 56b, is used to stop the machine at the conclusion of a complete drilling program. In other words, the hole I represents the end of the tape or of a programmed cycle of instructions. Output from this hole is delivered through the connections C and through the "or" gate 84 to drive the spool 71a upwardly and maintain it in the upward position. When the spool 71a is in its upper position, no drilling function can be initiated because no output can be delivered through the tube 71b, and therefore, the spool 2a remains in down position from which it does not move as long as the spool 71 is in its uppermost position. The system therefore, remains in quiescent condition.

This quiescent condition can be overcome for the purpose of starting a new drilling cycle by pressing the "start" button attached to the valve 85 and driving its spool 85a downwardly against bias from source P35. In this way, an output is delivered from pressure source P35 into the tube 85c and downwardly through the "or" gate 86 and into the tube 86a. This output is delivered to the lowermost port in the valve 69 and also to the rightmost port in the valve 81 through connections G and the "or" gate 80. The spool 69a in the valve 69 is temporarily moved upwardly so as to prevent any output from the valve 68 toward valve 70. This prevents any output from the valve 71 along the tube 71b so that the valve 2 leaves the drilling motor M in its upper position. At the same time, pressure flowing from the connections G through the tube 86a and the "or" gate 80 furnishes an input through the tube 80a into the valve 81 to move its spool 81a to the left and deliver an output in the tube 81b to drive the spool 64a to the right, thereby delivering an output to the tube 64b and into the valve 82 to retract the plunger 63a in the manner described above. This movement of the plunger causes an output to be delivered through the tube 63c to commence an indexing cycle. 35 p.s.i. air pressure from start valve 85 enters the bottom of valve 83 through "or" gate 100 raising bias pressure to 35 p.s.i. which overcomes the 17 p.s.i. pressure from valve 78, shifting spool 83a upwardly to prevent completion of the indexing cycle until the 35 p.s.i. from valve 85 is removed from valve 83. If the start cycle was not made a momentary "on" condition for valve 85, deleting would be continuous until the 35 p.s.i. pressure was removed from the bottom of valve 83. Once started, the cycle continues and includes indexing of the sprocket S, closing of the clamp 57, and reading of the tape and drilling of the hole as soon as the accelerometers 74 and 75 signify that the worktable V has stopped moving. All of these functions have been sequentially described above.

At any time that it becomes necessary or desirable to do so, the drilling operation can be stopped and the bit held in raised position by pressing the "stop drilling" button attached to the valve 77 and delivering an output through the tube 77b into the left input of the "or" gate 76. This pressure in the tube 77b when introduced into the "or" gate 76 has the same effect as the receiving of an output from an accelerometer would have. Namely, an output is delivered by the "or" gate 76 through the tube 76a to drive the spool 70a in the "and" gate 66 upwardly and thereby cut off the output to the tube 70c, through the valve 71 and into the tube 71b. This lack of output in 71b allows the spool 2a to be pushed downwardly by the pressure source P7, thereby causing an output to appear in the tube 1b to raise the motor M and bracket Q upwardly.

Referring again to the tape reader plate 56, in FIG. 1, there is a DELETE port J provided so that the instructions contained within any group of four rows of holes can be canceled by perforating the tape to pass air through the port marked J. Thus, if when making a tape of instructions a punching error is made, or if it is desired to omit the drilling of a hole called for in the instructions on a pre-prepared tape, punching of the "delete" hole J in the tape will cause the machine to pass up this group of instructions without following them. In such a case, the output from the hole J to the tube 56c passes through connections A and into the gate 86, and has the same effect as pressing the "start" button on the valve 85 except that valve 83 is not actuated to stop the index cycle at that point. It will be recalled that output from gate 86 in the tube 86a is delivered to the lower port of the normally conductive DELETE valve 69 to drive the spool of the valve 69 upwardly and interrupt the flow of air from the valve 68 to the valve 70, to valve 71 and to the valve 2. The spool 2a therefore drops or remains down and the tube 1b is continuously pressurized to maintain the motor M and bracket Q in raised position.

The present invention need not be used to operate a work-performing machine, but has broader utility in connection with coordinate positioning apparatus in which the information on the pre-prepared record cyclically moves the binary actuators to provide a series of coordinate positions which are established successively as the record moves past the reading position holes on the tape reader. For instance, in the absence of a drill head or other work-performing head, the accelerometers may be connected to operate the tape advancing means 60–65 inclusive each time the accelerometers come to rest, and the output of the registration detection means R can be connected to initiate positioning of the binary actuators 3–28 each time registration of the record with the reader holes is achieved.

The invention is not to be limited by the particular illustrative embodiment included in the drawings, for obviously, changes can be made therein within the scope of the following claims.

What is claimed is:

1. A cyclic system for successively plotting positions with respect to one or more coordinates from information on a prepared record comprising:
    (a) coordinate actuator means including plural series-connected binary actuators;
    (b) record reader means having plural reading positions respectively connected to operate plural outputs each corresponding with and connected to control one of said binary actuators;
    (c) advancing means for advancing the record with respect to said reading positions;
    (d) means for detecting motion of said actuator means;
    (e) means for detecting registration of the record with said reading positions; and
    (f) system sequencing means including means for operating said advancing means after motion of said actuator means has ceased, and including means for operating said actuator means when said registration has been detected.

2. A cyclic system for successively plotting positions with respect to one or more coordinates from information on a prepared record comprising:
    (a) coordinate actuator means including actuators disposed to act along each coordinate;
    (b) record reader means having plural reading positions connected with plural outputs connected to control said actuators;
    (c) advancing means for advancing the record with respect to said reading positions;
    (d) means for detecting completion of movement by said actuator means;
    (e) means for detecting registration of the record with said reading positions; and
    (f) system sequencing means including means for operating said advancing means after movement of said actuator means has been completed, and including means for operating said actuator means when said registration has been detected.

3. A system for successively orienting a workpiece support member and a function-performing head member with respect to one-another and for operating the latter according to information on a prepared record comprising:
    (a) actuator means connected to said members and including plural series-connected binary actuators;
    (b) record reader means having plural reading positions respectively connected to operate plural outputs each corresponding with and connected to control one of said binary actuators;
    (c) advancing means for advancing the record with respect to said reading positions;
    (d) function means for actuating said head to perform said function;
    (e) means for detecting movement of said actuator means;
    (f) means for detecting performance of said function by the head;
    (g) means for detecting registration of the record with said reading positions; and
    (h) system sequencing means including means for operating said advancing means after performance of said function has been detected, and including means for operating said actuator means when said registration has been detected, and including means for actuating said function means when movement of said actuator means has ceased.

4. A system for automatically controlling the functioning of a work-performing machine according to command information on a prepared record, said machine having relatively movable parts including a work head and a work-piece support, which parts are relatively positionable to orient one with respect to the other and relatively reciprocable toward and away from each other, said system comprising:
    (a) actuator means coupled to parts of the machine for orienting the head and the support relative to each other;
    (b) record reader means having outputs connected with the actuator means for reading the information from the record and positioning the actuator means in accordance therewith;
    (c) record advancing means for advancing the record and reader means with respect to each other;
    (d) first detector means for detecting the completion of movement of the actuator means during orientation;
    (e) moving means for reciprocating the parts with respect to each other;
    (f) second detector means responsive to the relative position of the parts to determine completion of a reciprocatory stroke and retraction therefrom; and
    (g) cyclic sequencing means connected for advancing the record advancing means to orient the actuator means according to the recorded information, and connected to the first detector means and operating the moving means to advance the head and support toward each other when the orientation is completed, and connected with the second detector means for operating the moving means to retract the head and support away from each other when the work stroke has been completed and for operating the record advancing means when retraction has been completed.

5. In a system as set forth in claim 4, gate means connected to said moving means to prevent advance of the parts toward each other when the gate means is actuated; and a manual "start" actuator connected to the gate means and to the record advancing means for actuating both when operated.

6. In a system as set forth in claim 5, a manual "stop" actuator connected to the gate means and operative when actuated to actuate said gate means and prevent advance of the parts toward each other.

7. A system for controlling the functioning of a work-performing machine having a work head and having a work-piece support, wherein the support and head are relatively positionable to orient one wtih respect to the other and are relatively movable toward and away from each other, according to a prepared record including plural discrete groups of machine command information wherein each group controls one functioning cycle of the machine, said system comprising:
    (a) actuator means coupled to the machine for orienting the head and the support relative to each other;
    (b) record reader means having outputs connected with the actuator means for reading the information from the record and positioning the actuator means in accordance therewith;
    (c) advancing means for periodically advancing the record and reader means with respect to each other to advance from one information group to the next;
    (d) first detector means for detecting relative motions between the head and the support during mutual orientation thereof;
    (e) moving means connected wtih the machine for moving the head and support toward and away from each other;
    (f) second detector means responsive to relative machine positions caused by said means for moving the head with respect to the support; and
    (g) cyclic sequencing means connected for periodically operating the record advancing means to orient the actuator means according to the information in successive groups, and responsive to cessation of motions detected by the first detector means for operating the moving means to advance the head and support toward each other when the orientation is completed, and responsive to an advanced position of the head and support as detected by the second detector means when the head has completed its function for moving the head and support away from each other and including means for operating the advancing means when the head and support are in mutually retracted position.

8. In a system as set forth in claim 7, said actuator means each comprising a plurality of binary actuators mechanically connected in series so that each actuator makes an incremental contribution to the composite movement capability of its system, and said record reader means having plural reading positions each corresponding with and connected to control one actuator.

9. In a system as set forth in claim 8, said cyclic sequencing means including a multiple-input "and" gate having an output connected to the moving means to advance the head and support toward each other when the inputs are enabled, one input being connected to said record advancing means to be enabled thereby each time the record is advanced, a second input being connected to the record reader means to be enabled thereby when an information group is positioned thereat, and a third input being connected to said first detector means to be enabled thereby when motions detected thereby have ceased.

10. In a system as set forth in claim 9, the reader means having plural reading positions operative with plural bits of information contained in each group and one of these positions comprising a "delete" position having an output connected to block one of the inputs to said "and" gate and prevent moving of the head and support toward each other during reading of a group containing "delete" information, and also connected to actuate said record advancing means.

11. In a system as set forth in claim 7, said record reader means including means for detecting proper registration of the information groups with the reader means, and means coupling the registration detecting means with said sequencing means to prevent advancing of the head and support toward each other until registration is achieved.

12. The combination of:
  (a) a work-performing machine having a drilling head member and having a work-piece support member wherein the members are relatively positionable to orient one with respect to the other and relatively reciprocable toward and away from each other to drill a hole in the work-piece;
  (b) a prepared record tape including plural discrete groups of machine command information bits wherein each group controls one orientation and hole-drilling cycle of the machine;
  (c) actuator means coupled to the members for orienting them relative to each other and including plural binary actuators mechanically connected in series and each capable when extended from its retracted position of contributing a definite increment of movement;
  (d) tape reader means having plural outputs connected respectively with the actuators for reading the bits of information from the record and selectively extending some of the actuators in accordance therewith;
  (e) tape advancing means for periodically advancing the tape with respect to the reader means to advance from one information group to the next;
  (f) accelerometer means for detecting relative motions between the members during mutual orientation thereof;
  (g) head moving means connected with the machine for reciprocating the head member toward and away from the support member;
  (h) limit switch means responsive to the extreme reciprocatory positions of the head member relative to the support member; and
  (i) cyclic sequencing means connected for periodically operating the tape advancing means to reorient the actuator means according to the bits of information in successive groups, and responsive to cessation of motions detected by the accelerometer means for operating the moving means to advance the head member toward the support member when the orientation is completed, and responsive to an extreme advanced position of the head member as detected by the limit switch means when the head member has completed its drilling function for retracting the head member away from the support and including means for operating the tape advancing means when the head member is in its extreme retracted position.

13. In a combination as set forth in claim 12, means for detecting accurate registration of an information group on the tape with the tape reader and for delivering an output dependent upon such registration; and means coupling this output with said sequencing means to prevent advancing of said head member until registration is achieved.

14. In a combination as set forth in claim 13, said cyclic sequencing means including a multiple input "and" gate having an output connected to advance the head moving means when the inputs are enabled, one input being connected to said tape advancing means to be enabled thereby each time the tape is advanced, a second input being connected to the tape reader means to be enabled thereby when registration is achieved, and a third input being connected with said accelerometer means to be enabled thereby when orientation motions have ceased.

15. In a combination as set forth in claim 14, said tape reader means having a "delete" output for delivering an output signal when a group on the tape includes "delete" information, and said "and" gate having a "delete" input connected to said "delete" output and when actuated blocking the output from the "and" gate to the head moving means and also connected to actuate said tape advancing means.

16. A fluid-pressure operated system for controlling the functioning of a work-performing machine having a work head member and having a work-piece support member wherein the members are relatively positionable to orient one with respect to the other and are relatively movable toward and away from each other according to a pre-punched tape including plural discrete groups of holes representing bits of machine command information, each group controlling one functioning cycle of the machine, said system comprising:
  (a) source means for supplying fluid under pressure to the system;
  (b) double-acting piston actuators connected with said members for orienting the latter, the actuators being mechanically coupled in series so that each contributes a definite increment of movement to the orientation, and said actuators being coupled with said source means to normally bias them in retracted positions;
  (c) tape reader means having tape reader ports for delivering a fluid output corresponding with each tape hole, and said outputs being connected with the actuators for selectively expanding those actuators receiving an output through holes punched in the tape in an information group;
  (d) tape clamp means for selectively clamping the tape to the reader means, and connected to the source means to pressurize ports through holes in the tape;
  (e) sprocket and ratchet means for advancing the tape through the reader means and including fluid actuated cylinder means for operating the ratchet means during advance from one information group to the next;

(f) fluid-operated accelerometer means connected to be accelerated by said double-acting piston actuators during orientation and delivering a fluid output when accelerated;

(g) reversible cylinder-actuator means for selectively reciprocating the members toward and away from each other;

(h) limit-switch valve means actuated at the extreme reciprocatory positions of said members to deliver one of two fluid outputs; and (i) cyclic sequencing valve and circuit means connected for actuating the ratchet cylinder means to advance the tape and to orient the actuator means according to the information bits in the next group, and connected for control by the accelerometer means to advance the reversible cylinder actuator to move the members toward each other when the orientation is completed, and connected to receive an output from the limit switch means to retract the reversible cylinder actuator and move the members away from each other when the work function is completed, and including means for operating the ratchet cylinder means and the clamp members are retracted.

17. In a system as set forth in claim 16, said sequencing means including an "and" gate comprising a plurality of binary fluid valves connected to said source means to be biased thereby into normal positions and each having an input duct for moving the valve into an actuated position, the valves being coupled in series to provide an output only when they are all enabled and said output being connected with said reversible cylinder actuator to advance said members toward each other, the input to one normally blocked valve being connected to said ratchet cylinder means to be enabled thereby when the tape has been advanced, and the input to one normally conductive valve being connected to the accelerometer means to be blocked thereby while orientation motions exist.

18. In a system as set forth in claim 17, said reader means including a tape registration port delivering an output when a hole in the tape is in registry therewith, and this output being connected with a second normally blocked valve in the "and" gate and enabling this valve when registration exists.

19. In a system as set forth in claim 17, said reader means including a "delete" port for delivering a "delete" output when a corresponding "delete" hole has been punched in the tape to delete performance of the machine cycle defined by the associated groups of holes, and this "delete" output being connected with a second normally conductive valve in the "and" gate to block this valve and connected to actuate said ratchet cylinder means to advance the tape to the next group.

20. In a system as set forth in claim 19, a manual cycle "start" valve delivering a first fluid output when actuated, and said reader means including a "stop" port delivering a "stop" output when a hole in the tape is in registry therewith, and a manual cycle "stop" valve delivering a second fluid output when actuated, said first fluid output being connected to the input of said second normally conductive valve and also to the tape clamp means and the ratchet cylinder means to advance the tape, and said second fluid output and said "stop" output being connected with a third normally conductive valve in the "and" gate to block the valve and move the reversible cylinder actuator means to retract the members away from each other.

No references cited.

WILLIAM W. DYER, JR., *Primary Examiner.*

F. S. HUSAR, *Assistant Examiner.*